(12) United States Patent
Shen

(10) Patent No.: US 7,539,131 B2
(45) Date of Patent: May 26, 2009

(54) NEXTHOP FAST REROUTER FOR IP AND MPLS

(75) Inventor: Naiming Shen, Santa Clara, CA (US)

(73) Assignee: Redback Networks Inc., San Jose, CA (US)

( * ) Notice: Subject to any disclaimer, the term of this patent is extended or adjusted under 35 U.S.C. 154(b) by 874 days.

(21) Appl. No.: 10/975,201

(22) Filed: Oct. 27, 2004

(65) Prior Publication Data

US 2005/0111351 A1 May 26, 2005

Related U.S. Application Data

(60) Provisional application No. 60/525,457, filed on Nov. 26, 2003.

(51) Int. Cl.
*H04L 12/26* (2006.01)
*H04L 12/28* (2006.01)

(52) U.S. Cl. ........................ 370/217; 370/225

(58) Field of Classification Search ................ 370/217, 370/218, 221, 225, 228
See application file for complete search history.

(56) References Cited

U.S. PATENT DOCUMENTS 6,987,727 B2 * 1/2006 Fredette et al. ............. 370/225

| | | | |
|---|---|---|---|
| 7,075,932 B2 * | 7/2006 | Matsuhira et al. | 370/395.31 |
| 7,120,151 B1 * | 10/2006 | Ginjpalli et al. | 370/395.1 |
| 7,280,472 B2 * | 10/2007 | Rigby et al. | 370/230.1 |
| 2003/0198182 A1 * | 10/2003 | Pegrum et al. | 370/225 |
| 2004/0062195 A1 * | 4/2004 | Mishra et al. | 370/217 |
| 2004/0114595 A1 * | 6/2004 | Doukai | 370/389 |

OTHER PUBLICATIONS

Naiming Shen, et al., "Calculating IGP Routes Over Traffic Engineering Tunnels," Networking Group, Jun. 1999, pp. 1-6.
D. Awduche, et al., "RSVP-TE: Extensions to RSVP for LSP Tunnels," Network Working Group, Dec. 2001, pp. 1-61.
R. Braden, et al., Resource ReSerVation Protocol (RSVP)—Version 1 Functional Specification, Network Working Group, Sep. 1997, pp. 1-112.

* cited by examiner

*Primary Examiner*—Min Jung
(74) *Attorney, Agent, or Firm*—Blakely, Sokoloff, Taylor & Zafman LLP

(57) ABSTRACT

Methods and apparatus for rerouting network traffic are described herein. In one embodiment, an example of process includes maintaining as a part of a routing table of a network element information regarding one or more backup links leading to a node using label switched protocols (LSPs), the node being adjacent to the network element, and in response to a failure of a primary link coupling the network element to the node, the network element rerouting network traffic to the node via the one or more backup paths without having to notifying and waiting for a response from a headend node that originates the network traffic. Other methods and apparatuses are also described.

24 Claims, 9 Drawing Sheets

|   0   |   1    |         2         |   3   |
|-------|--------|-------------------|-------|
| Type  | Length | IPv6 address (16 bytes) | |
| IPv6 address (continued) | | | |
| IPv6 address (continued) | | | |
| IPv6 address (continued) | | | |
| IPv6 address (continued) | | Prefix Length | Pad |

Fig. 4

| Inbound Label 701 | Outbound Label 702 | Outbound Interface 703 | NextHop IP Address 704 | Alternative Adjacentcy ID 705 |
|---|---|---|---|---|
| ... | ... | ... | ... | ... |

NEXTHOP FAST REROUTER FOR IP AND MPLS

RELATED APPLICATIONS

This application claims the benefit of United States Provisional Application No. 60/525,457, filed Nov. 26, 2003, which is hereby incorporated by reference.

FIELD OF THE INVENTION

The present invention relates generally to communications. More particularly, this invention relates to a nexthop fast rerouter for IP and MPLS.

BACKGROUND OF THE INVENTION

IP applications such as VoIP (voice over IP) and PWE3 (pseudo wire emulation edge to edge) are highly desirable to have the packet loss with less than 10s of milliseconds during network elements failure. Currently there are various approaches in practice or proposed to speed up the recovery from such failures as discussed below.

For example, MPLS (multi-protocol label switch) LSP (label switched path) fast reroute (FRR) mechanism is used to quickly re-route the RSVP (resource reservation protocol) LSP traffic onto a detour or bypass LSP when a local link failure is detected. Since the detour or bypass LSPs are pre-built before the local link failure, this re-route operation can be accomplished within 10s of milliseconds. If the IP backbone deploys network wide MPLS TE (traffic engineering), this MPLS FRR approach may be a desirable solution. The FRR is just another application using the existing MPLS infrastructure. However, it may be too expensive in certain circumstances to maintain such a network.

In addition, IGP (interior gateway protocol) fast convergence is another mechanism in reducing the packet loss time in network element failure. This mechanism also includes the improvement of LDP (label distribution protocol) convergence. Comparing with the MPLS LSP FRR solution, the recovery time is usually an order of magnitude higher, which is in the 100s of milliseconds range. For certain real-time applications, that duration is still acceptable and this is an improvement over "normal" IGP convergence time of seconds or even 10s of seconds.

Furthermore, pre-calculated alternative nexthops are downloaded into forwarding engines. As in the first mechanism, when a local link failure is detected, those alternative nexthops are used to continue forwarding the data traffic. If an alternative nexthop does exist, then the re-route time can be accomplished within 10s of milliseconds. There is a couple of shortcoming of this approach. There may not exist such an alternative nexthop for the IP destinations along with the links it intends to protect. When such alternative nexthops do exist, if there are many IGP interfaces and adjacencies on the node, this requires running many instances of SPF (shortest path first) in order to find a loop-free alternative. This scheme cannot be used to protect MPLS TE LSPs since they are not constructed from the native IP routing. Further, if the local link failure is shortly after some network events and the IGP on the node is busy calculating those SPFs, then the alternative nexthop picture is incomplete at that time and the re-route action may not be reliable.

SUMMARY OF THE INVENTION

Methods and apparatus for rerouting network traffic are described herein. In one embodiment, an example of process includes maintaining as a part of a routing table of a network element information regarding one or more backup links leading to a node using label switched protocols (LSPs), the node being adjacent to the network element, and in response to a failure of a primary link coupling the network element to the node, the network element rerouting network traffic to the node via the one or more backup paths without having to notifying and waiting for a response from a head-end node that originates the network traffic. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 4 is a block diagram illustrating a nexthop IPv6 address according to one embodiment of the invention.

FIG. 7 is a block diagram illustrating a data structure for managing information of next hops for the purposes of reroute according to one embodiment of the invention.

DETAILED DESCRIPTION

Figure 1:
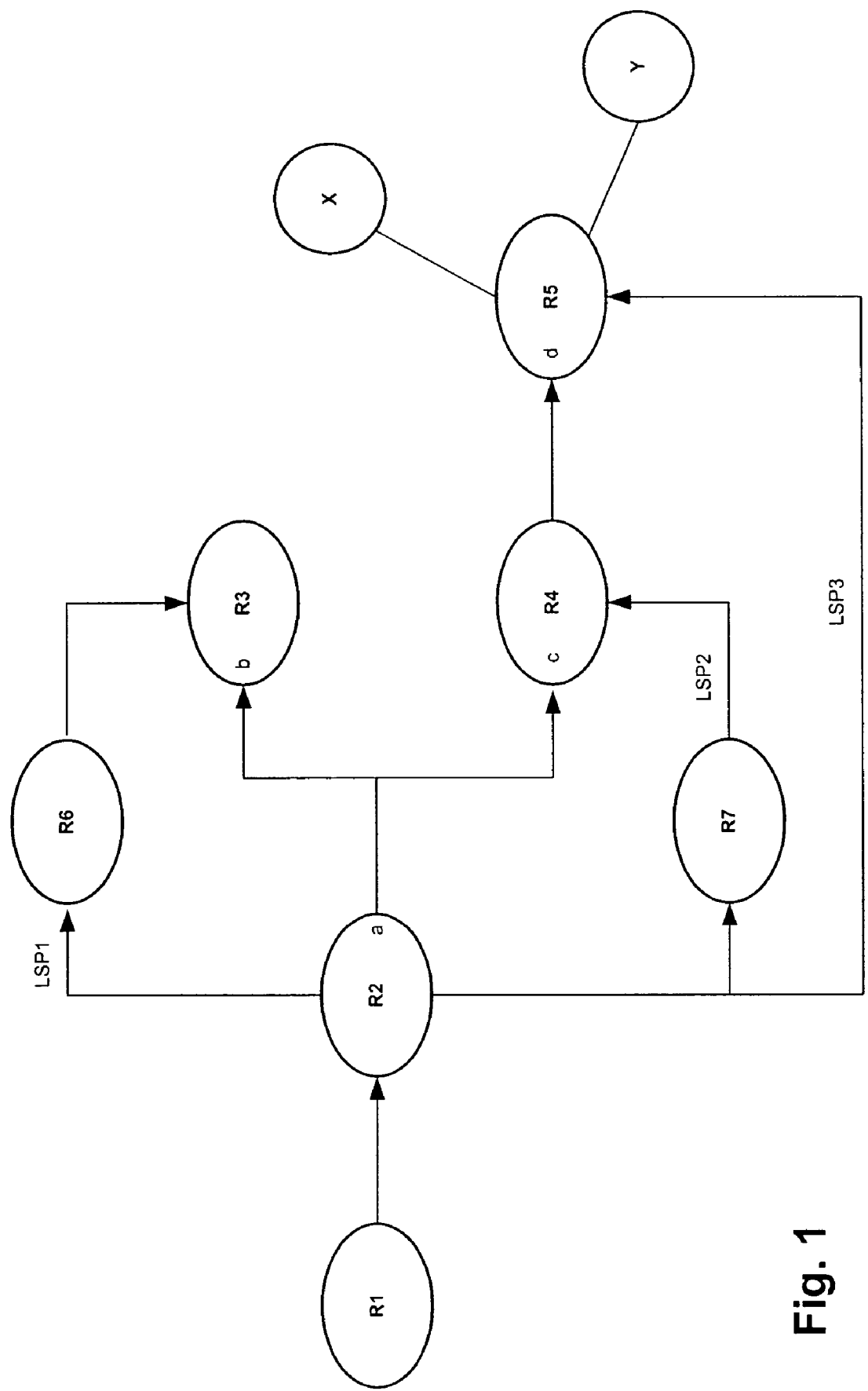
FIG. 1 is a block diagram illustrating a network configuration according to one embodiment of the invention.

A mechanism to quickly re-direct IP and/or MPLS traffic away from a local link or a nexthop failure is described. In one embodiment, an exemplary mechanism facilitates the needs of real-time IP applications over native IP networks or LDP based MPLS networks. The goal is to limit the IP packet loss duration in the network to 10s of milliseconds in the event of link failures. In one embodiment, RSVP signaled LSP is used with explicitly routed path as the re-direct tunnel, while the protected traffic can be either MPLS traffic engineered LSPs, LDP based LSPs, IP unicast, IP multicast traffic or a combination of these. In one embodiment, the mechanism can be applied to both point-to-point links and point-to-multipoint links. In addition, an optional RSVP bypass next-hop object is defined to detect misconfigured re-direct LSPs. The object can also be used to allow a modified RPF (reverse path forwarding) checks for re-directed IP multicast data. The node failure fast protection of native IP traffic is also described. Link State IGP can be used to make the IP prefixes association with next-nexthop nodes and the re-direct LSPs to those nodes.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable storage medium includes read only memory ("ROM"); random access memory ("RAM"); magnetic disk storage media; optical storage media; flash memory devices; etc. ; while machine-readable transmission medium includes electrical, optical, acoustical or other form of propagated signals (e.g., carrier waves, infrared signals, digital signals, etc.); etc.

Following are examples of terminology that are used throughout this application.
  LSP—An MPLS Label Switched Path. In this document, an LSP will refer to an explicitly routed LSP.
  LDP LSP—LSP signaled by LDP protocol.
  RSVP LSP—LSP signaled by RSVP protocol.
  NFRR—Nexthop Fast ReRoute Scheme
  NFRR LSP—Nexthop Fast ReRoute LSP, which is same as bypass LSP or re-direct LSP in this document.
  PLR—Point of Local Repair. The head-end LSR of a bypass LSP.
  MP—Merge Point. The tail-end LSR of a bypass LSP.
  Nexthop Node—The router is directly connected to the PLR node.
  Next-Nexthop Node—The router is the Nexthop node of PLR's Nexthop node.

According to one embodiment, the nexthop fast reroute (NFRR) mechanism proposed in this application is targeted to protect general data traffic in the event of a link failure. It does not make any assumption of the protected traffic is MPLS tunneled or not. If a network wide MPLS traffic engineering is not the goal of the network design, then the network can either stay with native IP or LDP LSPs but still get the reliable FRR benefits for link protection. In this scheme, RSVP signaled LSP may be used as the re-direct tunnel for protected links for the purposes of illustration. Those LSPs are explicitly routed to get around the intended failure points. In one embodiment, the LSP is used in the network as tools to fast re-direct data traffic.

Exemplary Nexthop Fast ReRoute (NFRR) Operation Schemes

Over a point-to-point communication protocol, there will be only one nexthop in general. However, there are multiple nexthops over a LAN interface. The NFRR is used to re-route traffic around the IP nexthop over the protected interface. Assume there is an alternative path to reach that nexthop node other than the protected link, an explicitly routed LSP to the node which owns this nexthop address may be pre-built. If the local link is down, or the nexthop is unreachable, the PLR (point of local repair) router can quickly re-direct the data traffic intended for this nexthop onto the NFRR LSP for that nexthop node. Thus any traffic can be fast re-routed in a loop-free fashion using NFRR. Over a LAN, the nexthop unreachable status can possibly be quickly detected using some link level aliveness protocols. When using NFRR protecting MPLS traffic, global label space scheme is assumed on the MP node. The NFRR for link protection is assumed in this section.

FIG. 1 is a block diagram illustrating an example of a NFRR according to one embodiment. Referring to FIG. 1, R2 is the PLR router. R2, R3 and R4 share a LAN connection with interfaces "a", "b" and "c" belong to the same prefix. R5 is a next-nexthop node from the PLR. LSP1 is sourced from R2 and explicitly route through R6 to reach R3. LSP1 is configured to protect "b" over interface "a". LSP2 is sourced from R2 to reach R4. LSP2 is configured to protect "c" over interface "a". LSP3 is sourced from R2 to reach R5. LSP3 is configured to protect "c" or node R4 over interface "a". The configuration shown in FIG. 1 is just an example of a NFRR. It will be appreciated that other configurations may be utilized.

When some of the protected traffic to the nexthop belongs to MPLS TE LSPs, according to one embodiment, the mechanism is similar to a facility based link-protection bypass tunnel scheme. Further detailed concerning the RSVP signaling extension regarding a facility based link-protection bypass tunnel scheme can be found in a publication, entitled "RSVP-TE: Extensions to RSVP for LSP Tunnels", published by D. Awduche, et al., RFC-3209, December 2001, which is hereby incorporated by reference. Most of the RSVP signaling extension described in RFC-3209 applies here. According to one embodiment, NFRR explicitly extends this into the protection of a nexthop to deal with point-to-multipoint case instead of protection of local link only, but the technique used is similar.

When the protected traffic is LDP LSPs, in one embodiment, LDP process can pre-build the association of the NFRR tunnel and the LDP LSPs which use this particular nexthop. When the link is down or the nexthop is unreachable, according to one embodiment, the forwarding engine can quickly switch the traffic onto that NFRR tunnel by pushing an outbound label and send it out.

In one embodiment, a table, also referred to as an adjacency table, is used to maintain next hop information with respect to a node. FIG. 7 is a block diagram illustrating an exemplary adjacency table according to one embodiment of the invention. The exemplary table 700 may be implemented as a part of a routing table maintained within a respective network element. According to one embodiment, the exemplary table 700 may be maintained within a line card, such as, line cards 802 of FIG. 8, of a network element.

Referring to FIG. 7, the exemplary table 700 includes, but is not limited to, an inbound label field 701, an outbound label field 702, an outbound interface 703, a nexthop IP address 704, and an alternative adjacency ID 705. Typically, when a network element receives a packet to be destined to a destination, the network element identifies the associated outbound interface 704 based on the inbound and/or outbound labels associated with the packet. The forwarding engine of the network element then transmits the packet to a nexthop based on the nexthop IP address 704 via the identified outbound interface.

When an outbound link is down, the respective network element may examine the adjacent table 700 to determine whether there is an alternative adjacency ID 705 that can be used an alternative route. If so, the forwarding engine of the network element may switch the traffic over to the alternative route, which bypasses the failed link. In one embodiment, the network element adjacent to the failed link may perform such operations without having to notify the head-end node and wait for a response from the head-end node.

In one embodiment, each node that provides protection of a specific node may maintain an adjacency table similar to the table 700 of FIG. 7, such that the network traffic may be switched over quickly once a link is detected down.

The PLR node can pre-build the association of the NFRR tunnel and the IP prefixes which use that same nexthop in the route lookup. When the nexthop failure is detected, in one embodiment, the forwarding engine will be able to re-route the IP traffic to those affected destinations onto the NFRR tunnel. The only difference from the LDP case is that, it only has one label on the label stack of the packet when being switch out to the NFRR LSP.

According to one embodiment, a reroute LSP may be built for each adjacent node (e.g. each nexthop), rather than each link. For example, if there are three nexthop nodes, three LSPs may be built, where each nexthop may have an individual identifier (e.g., IP address) maintained within the adjacency table.

Similar to the IP unicast case, according to one embodiment, the PLR node can pre-build the association of the NFRR tunnel and the (S, G) entries on the protected interface.

In the point-to-point case, according to one embodiment, there needs to be only one NFRR tunnel to be referenced in the (S, G) entries of the protected interface. In the LAN case, multiple NFRR tunnel references can exist in the (S, G) entries. When the protected interface is down, or one of the multicast forwarding downstream neighbor is unreachable, according to one embodiment, all or part of the NFRR tunnels can be applied to re-route multicast traffic to the downstream nodes.

Referring back to FIG. 1, assume R2 has both R3 and R4 as downstream for some (S, G)s, when the link "a" is down, the references in those (S, G)s should point to both LSP1 and LSP2. R2 needs to forward the multicast traffic through both LSP1 and LSP2.

In one embodiment, a new RSVP bypass nexthop object may be defined, which can be optionally inserted into a PATH message by the head-end of the NFRR LSP and a RESV message by the tail-end of the NFRR LSP. The bypassed link nexthop IP address of the NFRR tunnel can be conveyed to the tail-end node using the new RSVP bypass nexthop object. According to one embodiment, multicast RPF check algorithm may be modified to accept the multicast traffic for the (S, G)s on the alternative inbound interface even though the RPF check may currently point to the protected link which has that link nexthop IP address.

According to one embodiment, the NFRR LSP can protect native IPv6 traffic going to the same neighbor node over the protected interface. In this case, an IPv6 nexthop address can be configured along with the NFRR LSP. The same operation for unicast and multicast of IPv4 traffic mentioned above applies here.

In one embodiment, there are two types of protocol packets with regard to this scheme. One requires an IP route lookup such as, for example, BGP, OSPF VL, or RSVP packets. The other is sent directly over a local interface to neighbors such as ISIS, OSPF, PIM, or LDP adjacency packets. When the protected link is down or the protected nexthop is unreachable, according to one embodiment, the affected routable protocol packets may be re-routed over the NFRR tunnel while the directly transported protocol packets may be dropped in order to time out the protocol adjacency.

Exemplary Node Protection for IP Unicast Traffic

The NFRR scheme described above is for link and nexthop failure protection. In one embodiment, NFRR may be used for node protection in the case of IP unicast traffic. When the link or nexthop fails, in one embodiment, the forwarding engine switches the traffic using a route nexthop onto the NFRR LSP. In the node protection case, as long as the information regarding which routes using this nexthop also going to the next-nexthop node is maintained, the system is able to make the similar association to re-direct the traffic onto the NFRR LSP, which has the next-nexthop node as the tail-end.

For IP unicast traffic, this information regarding routes association with nexthop and next-nexthop nodes can be obtained from link state IGPs. IGP shortcut is a technique to dynamically direct IP traffic through TE LSPs. In the NFRR node protection case, according to one embodiment, the PLR can use those shortcuts when the nexthop element fails. In other words, this shortcut to the next-nexthop node is enabled by forwarding engine when it detects the link, nexthop or nexthop node failure. Otherwise, the shortcuts may be disabled during the normal IP traffic. Further detailed information concerning how to calculate the IGP routes can be found in an Internet draft work in progress, entitled "Calculating IGP Routes Over Traffic Engineering Tunnels", draft-hsmitshen-mpls-igp-spf-01.txt, of Naiming Shen, et al., which is hereby incorporated by references.

Referring to FIG. 1, route LSP3 is a NFRR LSP source from PLR R2 with destination of R5 to protect node R4 as well as link "a" and nexthop "c". IGP uses modified shortcut technique to associated prefixes X and Y with nexthop "c1" over interface "a". The IGP also installs a modified shortcut LSP3 to be associated with nexthop "c1". The nexthop "c1" is just like "c", but it contains the NFRR LSP LSP3 reference information. Basically if R4 has N nexthops, R2 will have "c1" through "cn" nexthops, each references a NFRR LSP to its next-nexthop node. The IP traffic to X and Y normally is forwarded to R4, in the event of "a", "c" or R4 failure, the traffic is re-directed to LSP3 into R5.

The algorithm for IGP shortcut described above has various ways to determine the first-hop information, according to one embodiment. For example, according to one embodiment, the system may examine the list of tail-end routers directly reachable via an NFRR-tunnel. If there is an NFRR-tunnel to this node, the first-hop information may be copied from the parent node(s) to the node. The NFRR-tunnel information may be attached to the first-hop information on this node.

The first-hop information of the node can be used to construct the nexthop and its association with the NFRR LSP destined to that node. The rest of the NFRR operation is similar to link protection case as described above.

Exemplary RSVP Bypass Nexthop Object

An NFRR LSP is similar to an explicitly routed LSP and it is used by the PLR to fast re-route traffic to the same neighbor over alternative interfaces. As mentioned above, re-routed multicast traffic may be dropped if the neighbor does not aware that certain multicast traffic may come in an alternative interface. According to one embodiment, a bypass nexthop object is used to pass this information from the head-end NFRR node to the tail-end node so that the RPF check on that protected interface can be modified to accept with an alternative interface. The tail-end node may send back the same or similar object to indicate whether the requested operation is supported.

Figure 2:
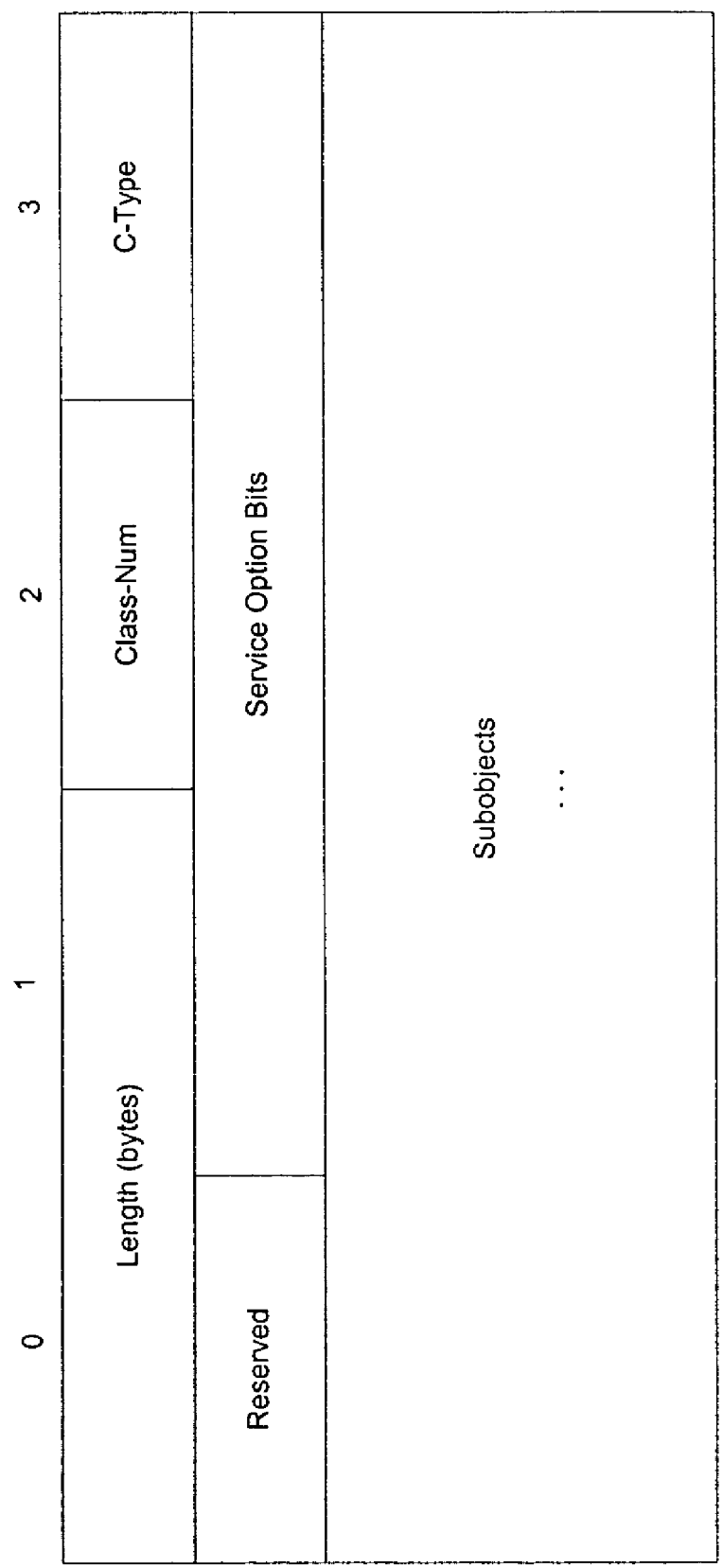
FIG. 2 is a block diagram illustrating a bypass nexthop object according to one embodiment of the invention.
Figure 3:
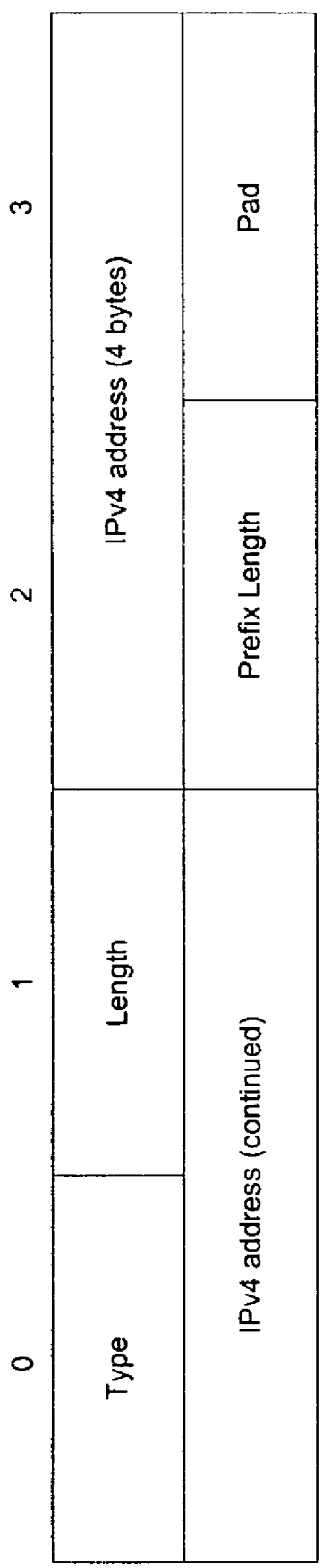
FIG. 3 is a block diagram illustrating a nexthop IPv4 address according to one embodiment of the invention.

NFRR LSP is used to protect the link failure, it is useful to know if the NFRR tail-end owns this bypassed nexthop address. According to one embodiment, an object can be inserted by the tail-end node in an RESV message to confirm that the acknowledged address is local to the node to prevent mis-configuration. An example of a bypass nexthop object is shown in FIG. 2, where Class=TBD (use form 11bbbbbb for compatibility) and C-Type=1 or 2. An example of a nexthop IPv4 address is shown in FIG. 3. An example of a nexthop IPv6 address is shown in FIG. 4.

This object with C-type of 1 is used in PATH message and C-type of 2 is used in RESV message. They are also referred to as request and acknowledgement objects. The request bypass nexthop object may be inserted into PATH message by the head-end of the NFRR LSP node, and may be changed by downstream LSRs. The ack bypass nexthop object may be inserted into the RESV message by the tail-end of the NFRR LSP node, and may not be changed by the upstream LSRs.

According to one embodiment, two bits may be defined for service option bits field in this document as following (position from the right most to left most):

Bits Description

1 Request/Ack this bypass nexthop address to be local to the NFRR LSP tail-end node. In the node protection case, the tail-end LSR may not set this bit in Ack.

2 Request/Ack this bypass nexthop address to be used to support modified multicast RPF checks as defined above.

Exemplary Forwarding Entry Update and NFRR LSP Reversion

The link down or nexthop unreachable event will eventually reach the protocols such as OSPF or LDP. Regardless of IGP fast convergence is used or not, according to one embodiment, the new forwarding entry downloading should be held for a little longer than the expected network convergence time. This is to guarantee all the nodes in the routing area have converged onto the new topology to avoid the possibility of forwarding loops. It is safe to send traffic over the NFRR LSP even after the network is converged. Since before the link failure, the PLR was using the nexthop node to reach some IP destination; it will be unlikely that the nexthop node sends the traffic back to the PLR after the adjacent link fails.

Since the NFRR scheme is nexthop entry based, according to one embodiment, when those entries are updated after the NFRR takes place, the re-route action for those entries will be reverted to normal operation. Referring to FIG. 1, in one embodiment, R2 used to reach prefix X and Y through nexthop "c" of R4. When "a" or "c" is down, the traffic towards X and Y will be tunneled in LSP2 to use the same R4 for further forwarding. After the hold-down time expires and R2 decides to use R7 as the new IP nexthop for X and Y. When R2 downloads X and Y into the forwarding engine, this update will revert the re-route operation for traffic to X and Y. If the link "a" comes up before the hold-down time expires, R2 will use "c" as the nexthop for X and Y again. The reversion time and operation is similar in both cases. Fast convergence of IGP will improve the network performance even with the NFRR presents. It can help to quickly reach the more optimal forwarding state in the routing domain with topology change.

Exemplary LDP Node Protection

Figure 5:
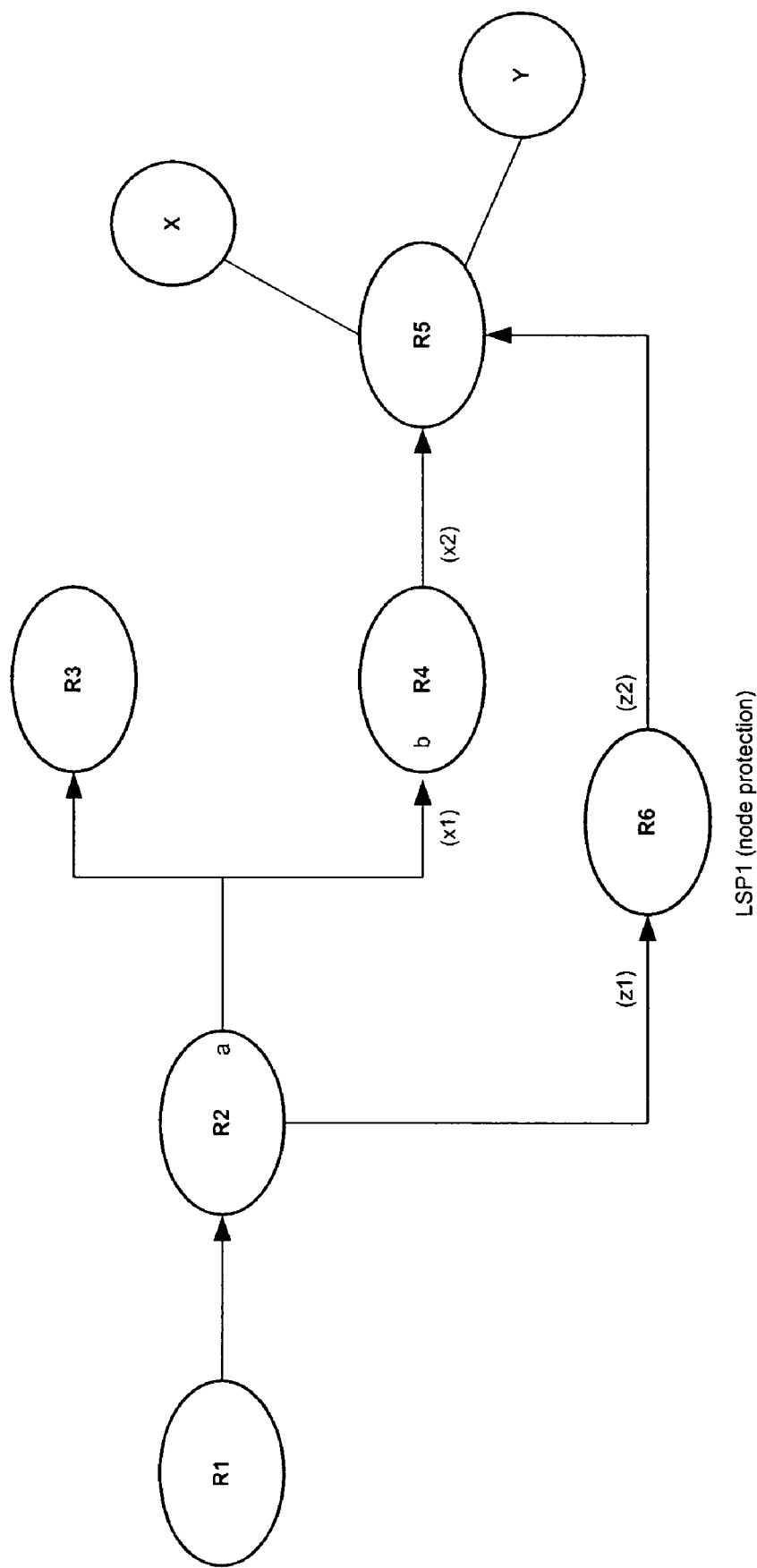
FIG. 5 is a block diagram illustrating a network configuration according to another embodiment of the invention.

FIG. 5 is a block diagram illustrating an exemplary LDP node protection according to one embodiment of the invention. Referring to FIG. 5, R2 is the PLR (point of local repair) node, the LSP1 is the NFRR LSP for the purpose of protecting node R4 over R2's interface "a". R5 advertises FEC X to R4 with label x1. R4 advertises the same FECs with label x2 to upstream peer R2. The RSVP signaled LSP1 uses label z1 from R2 to R6 and z2 from R6 to R5, and z2 can also be an implicit null.

When R2 detects either the interface "a" is down, or the nexthop "b" is unreachable, or LSR R4 is down, the forwarding engine on R2 will re-direct the LDP data traffic into the NFRR tunnel LSP1. This can be quickly done by pushing the label x1 onto the label stack and send the packet through the LSP1 for LDP data traffic going to FEC X. As long as the platform-wide label space is used on LSR R5, the R5 does not even know the difference. In this case, the next-nexthop label x1 is used by PLR node R2 for fast re-route with node-protection. For this scheme to work, LSR R4 needs to advertise the next-nexthop label x1 to the upstream LSR R2 in addition to their own label mapping of x2 for the same FEC.

Exemplary LDP Next-Nexthop Label Schemes

According to one embodiment, referring to FIG. 5, a user can statically configure on LSR R4 that it needs to include downstream labels to all or some of the upstream peers while it advertises the label mappings. A better way is for LSR R2 to make a request to its peer R4 that it is interested in receiving the next-nexthop label mapping information, since R2 has already been configured to perform node-protection for LSR R4.

When the LDP peer between R2 and R4 is up, and there is at least one NFRR LSP configured on R2 to perform node-protection of R4, R2 can optionally send a notification message with the next-nexthop Label Request bit set in the Status TLV. When the last NFRR LSP protecting node R4 is removed, R2 can optionally send the notification message to R4 with the next-nexthop label withdraw bit set in the status TLV.

When an LSR advertises the FEC-label bindings to its peer, if it has received the next-nexthop label request from that peer or the LSR is configured with this capability, it may include the next-nexthop label mapping information when applicable in the label mapping message.

An optional next-nexthop label TLV may be defined to be used in the label mapping message. The next-nexthop label includes a list of tuples (e.g., label, downstream router-id). More than one tuple may be used when there is an ECMP case to different downstream nodes for the same FECs. It is an implementation and local configuration issue whether to announce only one or multiple tuples in the ECMP case.

If some FECs are not advertised with next-nexthop labels, then no node-protection can be performed on those FECs. But they can still be fast re-routed with NFRR link-protection scheme. If there is a NFRR LSP built from R2 to R4, then the LDP data traffic will be re-routed directly onto R4 itself. The node-protection is not meant for all the situations. Usually, node-protection is used in the backbone portion of the network, and link-protection is used close to the edge of the network.

If an LSR advertises the next-nexthop Label TLV in the label mapping messages, and when the next-nexthop label information changes, it may resend the label mapping message with updated next-nexthop label information. The LSR may implement a way to dampen the re-advertisement to avoid potentially excessive updating due to link flapping.

Exemplary LDP Next-Nexthop Packet Encoding

The next-nexthop label request/withdraw information is sent in the notification message. According to one embodiment, two bits (to be allocated by IANA) are defined in this document, one for request and one for withdraw. Unlike most of the bits already defined in the status TLV, the next-nexthop label bits are used by an LSR to dynamically announce a capability to its peers. The E bit and F bit may be set to zero if next-nexthop label request or withdraw is the only status code set. The next-nexthop label bits may only be used in notification message. Otherwise, it may be quietly ignored upon receipt.

Figure 6:
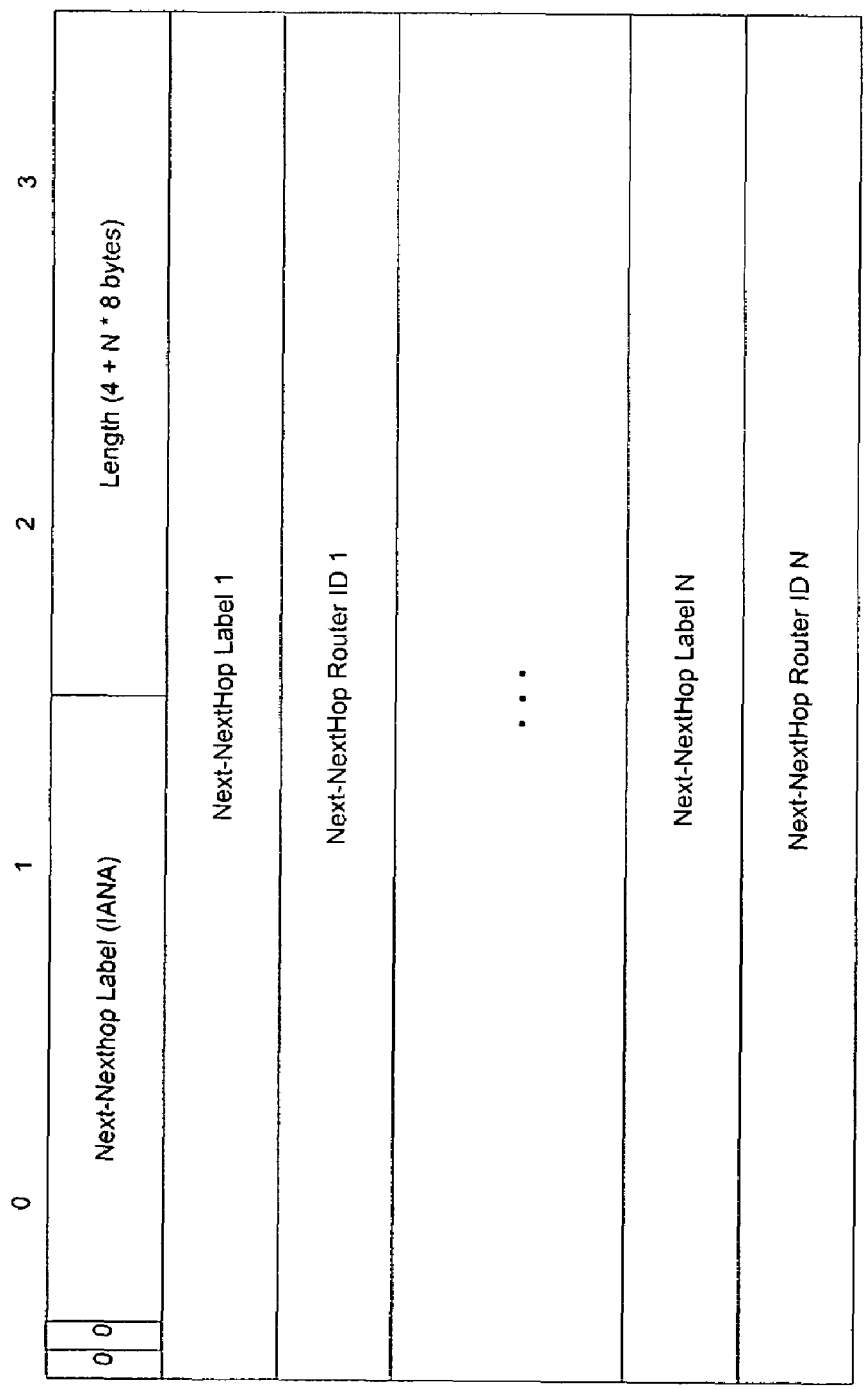
FIG. 6 is a block diagram illustrating a network packet which may be in an embodiment of the invention.

FIG. 6 is a block diagram illustrating an exemplary next-nexthop label TLV label mapping message according to one embodiment of the invention. Referring to FIG. 6, the next-nexthop Label TLV can be optionally carried in the optional parameters field of a label mapping message. The TLV includes a list of pairs (e.g., label, router-id) as shown in FIG. 6. In one embodiment, a next-nexthop label includes a 20-bit label value as specified in represented as a 20-bit number in a 4 octet field.

The NFRR scheme is independent of ECMP case and the loadsharing algorithm is relatively similar. The NFRR LSP is used to protect one particular nexthop, only the portion of traffic used to use this nexthop will be re-routed in the failure event.

Even in the case the network does not use MPLS TE for normal traffic, bandwidth reservation for NFRR LSPs can still be applied. The RSVP interface bandwidth will reflect the amount of link bandwidth reserved for re-route purpose.

Since NFRR can be applied to any traffic in link protection case, it is an implementation or configuration issue to decide which type of traffic will be applied, others may be dropped. Even within the same type of traffic, filters can be designed to select only the traffic using certain destination or labels will be re-routed if the bandwidth is an issue.

In node protection case, besides the MPLS FRR technique, IP unicast traffic can be applied using the IGP modified short-cut technique. With non-stop forwarding, protocol graceful restart and software modular design make good inroad into provider's networks, a complete node failure will become rare events and a node down often can be scheduled.

Exemplary Network Element

Figure 8:
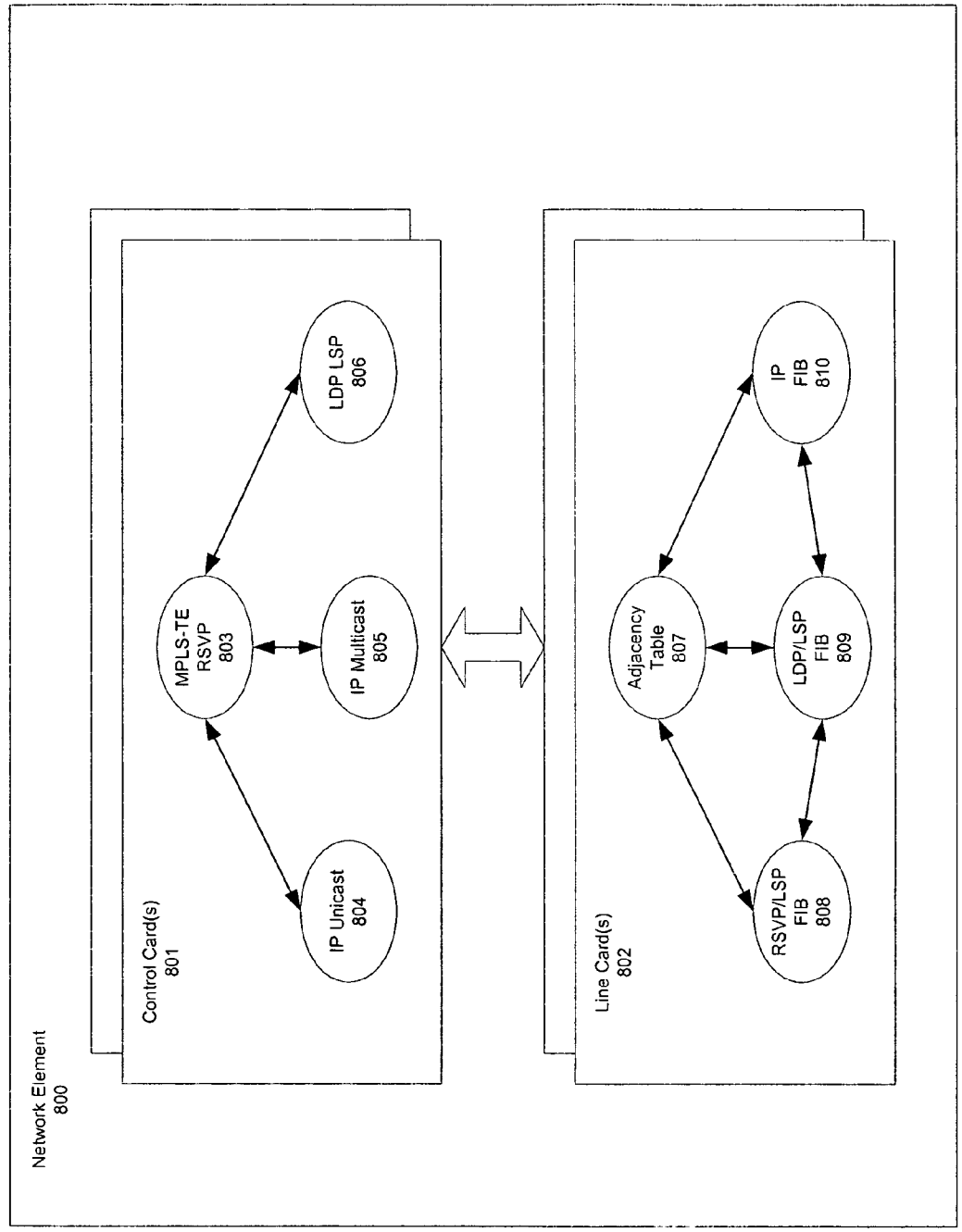
FIG. 8 is a block diagram illustrating a network element for performing a fast reroute according to one embodiment of the invention.

FIG. 8 is a block diagram illustrating an example of a network element, which may be used by one of the embodiments described above. Referring to FIG. 8, according to one embodiment, the exemplary network element 800 includes, but is not limited to, one or more control cards 801 communicatively coupled to one or more line cards 802. At least one of the control cards 801 includes an MPLS-TE RSVP module 803. The MPLS-TE RSVP module 803 is responsible for creating backup paths for reroute purposes for a variety of types of network traffic, such as, for example, IP unicast 804, IP multicast 805, and LDP LSP 806, etc.

In one embodiment, the control cards 801 communicate the reroute information to one or more line cards 802. In one embodiment, at least one line card includes an adjacency table 807, which may or may not be a part of a routing table maintained by the respective line card. In a particular embodiment, the reroute information and the adjacency table information may be accessed by one or more FIBs (forwarding information bases) for a specific type of traffic, such as, for example, RSVPILSP FIB 808, LDP/LSP FIB 809, and IP FIB 810, etc.

Figure 9:
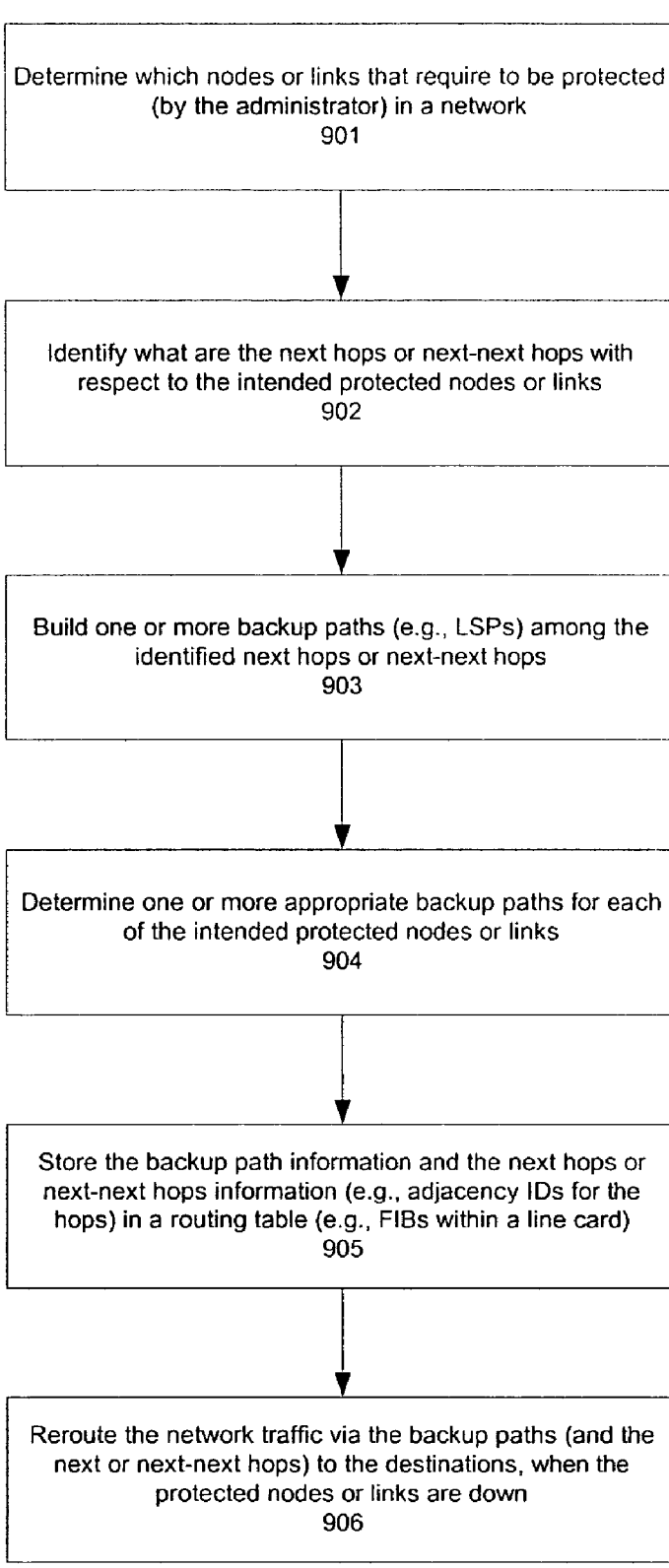
FIG. 9 is a flow diagram illustrating an exemplary process for rerouting network traffic according to one embodiment of the invention.

FIG. 9 is a flow diagram of an exemplary process for rerouting network traffic according to one embodiment of the invention. Exemplary process 900 may be performed by a processing logic that may comprise hardware (circuitry, dedicated logic, etc.), software (such as is run on a dedicated machine), or a combination of both. In one embodiment, exemplary process 900 includes, but is not limited to, identifying one or more next hops with respect to a node that is intended to protect, build one or more backup paths among the identified next hops, storing the backup path information and the identified next hop information in a routing table, and rerouting network traffic via the backup paths and the identified next hops to an intended destination of the network traffic, when the protected node fails.

Referring to FIG. 9, at block 901, the processing logic determines which nodes or links that required to be protected in a network. In one embodiment, these operations may be performed by an administrator of the network. At block 902, the processing logic identifies what the next hops or next-next hops of the intended protected nodes or links. At block 903, the processing logic builds one or more backup paths among the identified next hops or next-next hops. In one embodiment, the backup paths may be created using LSPs in conjunction with RSVP-TE protocols.

At block 904, the processing logic determines one or more appropriate backup paths for each of the intended protected nodes or links. At block 905, the processing logic stores the backup path information and the next hop or next-next hop information in a routing table. In one embodiment, the next hop or next-next hop information may include one or more adjacency IDs stored in an adjacency table associated with the routing table. In one embodiment, the adjacency table may be stored in a FIB of a line card communicatively coupled to a control card of network element, such as, exemplary network element 800 of FIG. 8. When a protected node or link is down, at block 906, the network traffic is rerouted to the destinations via the backup paths. Other operations may also be performed.

Thus, methods and apparatus for rerouting network traffic have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for rerouting network traffic including IP unicast traffic or IP multicast traffic, the method comprising:
   maintaining as a part of a routing table of a first network element information regarding one or more label switched paths (LSPs) each being a backup link to a different network element, the different network elements being adjacent to the first network element; and
   in response to a failure of a primary link coupling the first network element to one of the different network elements and carrying the network traffic, the first network element rerouting the network traffic to that one of the different network elements via the corresponding backup link to that one of the different network elements without notifying and waiting for a response from a headend network element originating the network traffic.

2. The method of claim 1, wherein the primary link and the backup link to a particular network element are coupled to different interfaces of that particular network element.

3. The method of claim 1, wherein the one or more label switched paths are created using MPLS-TE RSVP protocols.

4. The method of claim 3, wherein the one or more LSPs protect network traffic including IP unicast, IP multicast, and LDP LSP traffic.

5. The method of claim 1, wherein the backup link information is stored within a forwarding information base (FIB) of a line card of the network element.

6. The method of claim 1, wherein at least one of the backup links is routed through a plurality of network elements.

7. A machine-readable storage medium having executable code to cause a machine to perform a method, the method comprising:
   maintaining as a part of a routing table of a first network element information regarding one or more label switched paths (LSPs) each being a backup link to a different network element, the different network elements being adjacent to the first network element; and
   in response to a failure of a primary link coupling the first network element to one of the different network elements and carrying the network traffic, the first network element rerouting the network traffic to that one of the different network elements via the corresponding backup link to that one of the different network elements without notifying and waiting for a response from a headend network element originating the network traffic.

8. The machine-readable storage medium of claim 7, wherein the primary link and the backup link to a particular network element are coupled to different interfaces of that particular network element.

9. The machine-readable storage medium of claim 7, wherein the one or more label switched paths are created using MPLS-TE RSVP protocols.

10. The machine-readable storage medium of claim 9, wherein the one or more LSPs protect network traffic including IP unicast, IP multicast, and LDP LSP traffic.

11. The machine-readable storage medium of claim 7, wherein the backup link information is stored within a forwarding information base (FIB) of a line card of the network element.

12. The machine-readable storage medium of claim 7, wherein at least one of the backup links is routed through a plurality of network elements.

13. A network element, comprising:
   a control card to maintain as a part of a routing table of the network element information regarding one or more label switched paths (LSPs) each being a backup link leading to a different network element, the different network elements being adjacent to the network element; and
   a line card communicatively coupled to the control card, in response to a failure of a primary link coupling the network element to one of the different network elements and carrying network traffic including IP unicast or IP multicast traffic, the line card to reroute the network traffic to that one of the different network elements via the corresponding backup link to that one of the different network elements without notifying and waiting for a response from a headend network element that originates the network traffic.

14. A method for rerouting network traffic, the method comprising:
   maintaining as a part of a routing table of a first network element information regarding a label switched path (LSP) being a backup path to a third network element that is a next-nexthop of the first network element, that backup path protecting against a failure of a second network element coupled with the first and third network elements, the second network element being a nexthop of the first network element, and the third network element being a nexthop of the second network element; and
   in response to a failure of the second network element, the first network element rerouting network traffic to the third network element via the backup path without notifying and waiting for a response from a headend network element originating the network traffic.

15. The method of claim 14, further comprising maintaining an adjacency table associated with the routing table, the adjacency table including information identifying the third network element.

16. The method of claim 15, wherein the information identifying the third network element includes an IP address of the third network element.

17. The method of claim 15, wherein the adjacency table further includes an inbound label identifying an incoming traffic and an outbound label identifying an outbound traffic.

18. The method of claim 17, wherein the adjacency table further includes an outbound interface associated with the outbound label, and wherein output traffic is rerouted to the third network element via the outbound interface and the outbound label.

19. A machine-readable storage medium having executable code to cause a machine to perform a method, the method comprising:
   maintaining as a part of a routing table of a first network element information regarding a label switched path (LSP) being a backup path to a third network element that is a next-nexthop of the first network element, that backup path protecting against a failure of a second network element coupled with the first and third network elements, the second network element being a nexthop of the first network element, and the third network element being a nexthop of the second network element; and in response to a failure of the second network element, the first network element rerouting network traffic to the third network element via the backup path without notifying and waiting for a response from a headend network element originating the network traffic.

20. The machine-readable storage medium of claim 19, further comprising maintaining an adjacency table associated with the routing table, the adjacency table including information identifying the third network element.

21. The machine-readable storage medium of claim 20, wherein the information identifying the third network element includes an IP address of the third network element.

22. The machine-readable storage medium of claim 20, wherein the adjacency table further includes an inbound label identifying an incoming traffic and an outbound label identifying an outbound traffic.

23. The machine-readable storage medium of claim 22, wherein the adjacency table further includes an outbound interface associated with the outbound label, and wherein output traffic is rerouted to the third network element via the outbound interface and the outbound label.

24. A network element, comprising:

a control card to maintain as a part of a routing table of a first network element information regarding a label switched path (LSP) being a backup path to a third network element that is a next-nexthop of the first network element, that backup path to protect against a failure of a second network element coupled with the first and third network elements, the second network element being a nexthop of the first network element, and the third network element being a nexthop of the second network element; and a line card communicatively coupled to the control card, in response to a failure of the second network element, the line card to reroute network traffic to the third network element via the backup path without notifying and waiting for a response from a headend network element that originates the network traffic.

* * * * *